US006996813B1

(12) United States Patent
Sokolov et al.

(10) Patent No.: US 6,996,813 B1
(45) Date of Patent: Feb. 7, 2006

(54) FRAMEWORKS FOR LOADING AND EXECUTION OF OBJECT-BASED PROGRAMS

(75) Inventors: Stepan Sokolov, Fremont, CA (US); David Wallman, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 530 days.

(21) Appl. No.: 09/703,449

(22) Filed: Oct. 31, 2000

(51) Int. Cl.
G06F 9/45 (2006.01)

(52) U.S. Cl. ............... 717/148; 717/139; 717/140; 717/166

(58) Field of Classification Search ........ 717/136–167; 709/1; 712/209
See application file for complete search history.

(56) References Cited

U.S. PATENT DOCUMENTS

| 4,086,626 | A | | 4/1978 | Chung |
| 4,199,811 | A | | 4/1980 | Borgerson et al. |
| 4,667,290 | A | | 5/1987 | Goss et al. |
| 4,910,731 | A | | 3/1990 | Sakurai et al. |
| 5,418,964 | A | | 5/1995 | Conner et al. |
| 5,815,718 | A | | 9/1998 | Tock |
| 5,838,980 | A | | 11/1998 | Guillen et al. |
| 5,872,978 | A | | 2/1999 | Hoskins |
| 5,878,430 | A | | 3/1999 | Lafuse |
| 5,893,084 | A | | 4/1999 | Morgan et al. |
| 5,899,997 | A | | 5/1999 | Ellacott |
| 5,903,761 | A | | 5/1999 | Tyma |
| 5,920,720 | A | * | 7/1999 | Toutonghi et al. .......... 717/148 |
| 5,970,242 | A | | 10/1999 | O'Connor et al. |

(Continued)

FOREIGN PATENT DOCUMENTS

EP 0810522 A2 12/1997

(Continued)

OTHER PUBLICATIONS

Case B: "Implementing The Java Virtual Machine Java's Complex Instruction Set Can Be Built in Software or Hardware," Microprocessor Report, vol. 10, No. 4, Mar. 25, 1996, pp. 12-17.

(Continued)

*Primary Examiner*—Tuan Dam
*Assistant Examiner*—Chuck Kendall
(74) *Attorney, Agent, or Firm*—Beyer Weaver & Thomas, LLP

(57) ABSTRACT

Improved frameworks for loading and execution of portable, platform independent programming instructions within a virtual machine are described. The improved frameworks provides a mechanism that will generally improve the runtime performance of virtual machines by eliminating the need to always traverse a constant pool at runtime to execute a Java™ instruction. In addition, specific data structures that are suitable for use within a virtual machine and methods for creating such data structures are described. Accordingly, an enhanced Java™ bytecode representation having a pair of Java™ bytecode streams is disclosed. The enhanced Java™ bytecode has a Java™ code stream suitable for storing various Java™ commands as bytecodes within a code stream. A Java™ data stream of the enhanced Java™ bytecode representation is used to store the data parameters associated with the Java™ commands in the code stream. Actual parameter values, or references to actual parameter values can be provided in the data stream. Thus, data parameters can be provided for efficient execution of Java™ instructions without requiring further processing of Constant Pool at run time. As a result, the performance of Java™ complaint virtual machine can be enhanced.

27 Claims, 8 Drawing Sheets

U.S. PATENT DOCUMENTS

| | | | |
|---|---|---|---|
| 5,978,585 | A | 11/1999 | Crelier |
| 6,003,038 | A | 12/1999 | Chen |
| 6,021,469 | A | 2/2000 | Tremblay et al. |
| 6,026,237 | A | 2/2000 | Berry et al. |
| 6,026,485 | A | 2/2000 | O'Connor et al. |
| 6,047,125 | A | 4/2000 | Agesen et al. |
| 6,072,951 | A | 6/2000 | Donovan et al. |
| 6,072,953 | A | 6/2000 | Cohen et al. |
| 6,075,942 | A | 6/2000 | Cartwright, Jr. |
| 6,081,665 | A | 6/2000 | Nilsen et al. |
| 6,096,095 | A * | 8/2000 | Halstead ............... 717/107 |
| 6,101,580 | A | 8/2000 | Agesen et al. |
| 6,118,940 | A | 9/2000 | Alexander, III et al. |
| 6,151,618 | A * | 11/2000 | Wahbe et al. ............... 709/1 |
| 6,151,703 | A | 11/2000 | Crelier |
| 6,163,780 | A | 12/2000 | Ross |
| 6,182,202 | B1 | 1/2001 | Muthukkaruppan |
| 6,202,208 | B1 | 3/2001 | Holiday, Jr. |
| 6,205,578 | B1 * | 3/2001 | Grove ............... 717/118 |
| 6,223,202 | B1 | 4/2001 | Bayeh |
| 6,260,187 | B1 | 7/2001 | Cirne |
| 6,292,883 | B1 * | 9/2001 | Augusteijn et al. ......... 712/209 |
| 6,317,872 | B1 | 11/2001 | Gee et al. |
| 6,324,685 | B1 | 11/2001 | Balassanian |
| 6,330,709 | B1 | 12/2001 | Johnson et al. |
| 6,332,215 | B1 * | 12/2001 | Patel et al. ............... 717/141 |
| 6,338,160 | B1 | 1/2002 | Patel et al. |
| 6,339,841 | B1 | 1/2002 | Merrick et al. |
| 6,349,377 | B1 | 2/2002 | Lindwer |
| 6,372,286 | B1 | 4/2002 | Azuma et al. |
| 6,374,286 | B1 | 4/2002 | Gee et al. |
| 6,412,108 | B1 | 6/2002 | Blandy et al. |
| 6,427,228 | B1 | 7/2002 | Wigger |
| 6,434,625 | B1 | 8/2002 | Loen |
| 6,434,694 | B1 | 8/2002 | Slaughter et al. |
| 6,442,753 | B1 | 8/2002 | Gerard et al. |
| 6,446,084 | B1 | 9/2002 | Shaylor et al. |
| 6,446,254 | B1 | 9/2002 | Chapman et al. |
| 6,467,037 | B1 | 10/2002 | Griesemer |
| 6,477,702 | B1 | 11/2002 | Yellin et al. |
| 6,496,871 | B1 | 12/2002 | Koyama et al. |
| 6,553,565 | B2 | 4/2003 | Click, Jr. et al. |
| 6,557,023 | B1 | 4/2003 | Taivalsaari |
| 6,557,054 | B2 | 4/2003 | Reisman |
| 6,571,388 | B1 | 5/2003 | Venkatraman et al. |
| 6,584,612 | B1 | 6/2003 | Mueller et al. |
| 6,643,711 | B2 | 11/2003 | Bracha et al. |
| 6,658,421 | B1 | 12/2003 | Seshadri |
| 6,684,394 | B1 | 1/2004 | Shann |
| 6,704,803 | B2 | 3/2004 | Wilson et al. |
| 6,704,923 | B1 | 3/2004 | Gosling |
| 6,738,977 | B1 | 5/2004 | Berry et al. |
| 6,851,108 | B1 | 2/2005 | Syme et al. |
| 6,851,111 | B2 | 2/2005 | McGuire et al. |
| 2002/0046298 | A1 | 4/2002 | Bak et al. |
| 2002/0170041 | A1 | 11/2002 | Shann |
| 2002/0170043 | A1 | 11/2002 | Bagley et al. |
| 2002/0188726 | A1 | 12/2002 | Schick et al. |

FOREIGN PATENT DOCUMENTS

| | | |
|---|---|---|
| EP | 0943989 A2 | 9/1999 |
| EP | 0 996 059 A2 | 4/2000 |
| EP | 0996059 A2 | 4/2000 |
| WO | WO99/18484 | 4/1999 |
| WO | WO99/31576 | 6/1999 |
| WO | WO01/22213 A2 | 3/2001 |
| WO | WO02/41145 A2 | 5/2002 |
| WO | WO02/077807 A1 | 10/2002 |

OTHER PUBLICATIONS

McNeley KJ et al., "Emulating a Complex Instruction Set Computer With a Reduced Instruction Set Computer," IEEE Micro, IEEE Inc. New York, US, vol. 7, No. 1, Feb. 1987, pp. 60-71.

Jean-Paul Billon, "JEFFWEG4 (J Executable File Fomat), Release 1.0 Achievements, Sep. 29, 2000," J. Consortium Jeff Workiing Group, Online! Feb. 22, 2001, p. 1-24.

Jean-Paul Billon, "J Executable File Format (JEFF) Specification, Draft," J Consortium Jeff Working Group, Online! Feb. 22, 2001, p. 1-43.

Lindholm et al.. "The Java Virtual Machine Specification", Sep. 1996.

Robert Griesemer, entitled "Utilizing A Program Counter With One or More Data Counters For Executing Instructions," U.S. Appl. No. 09/107,939, filed Jun. 30, 1998.

Patrice Po,imville, "Annotating Java Bytecode," Project Report, McGill University, Online, Apr. 2000, pp. 1-7. XP-002254149.

Yourst, "Inside Java Class Files," Dr. Dobb's Journal, Jan. 1998, XP-002254150.

Hummel et al., "Annotating the Java bytecodes in support of optimization," Concurrency: Practice and Experience, John Wiley and Sons, vol. 9(11), Nov. 1997, pp. 1003-1016. XP-001131083.

Lindholm et al., "The Java Virtual Machine Specification," Second Hand, Apr. 1999, pp. 117-132. XP-002254151.

Dahm, Markus, "Byte Code Engineering", 1999, Java Information Tag, Proceedings of JIT'99: Java-Information'Tage, Dusseldorf, Germany, vol. 20-21, pp. 267-277, XP-002262007.

Meyer et al., "Java Virtual Machine" O'Reilly & Associates, Inc., 1997. XP-002262008.

Lambright H D, "Java Bytecode Optimizations" Proceedings of IEEE Compcon '97. San Jose, Feb. 23-26, 1997, pp. 206-210, XP-000751784.

Accomazzo E et al., "Integrating intermediate Code Optimization with Retargetable Code Generation" Microprocessing and Microprogramming, Elsevier Science Publishers, BV. Amsterdam, NL, vol. 30, No. 1/5, Aug. 1, 1990, pp. 475-481, XP000141684.

Tim Ritchey, "Java!" 1995, New Riders Publishing, pp. 326-343.

Jon Meyer & Troy Downing, "Java Virtual Machine," O'Reilly & Associates, Inc. pp. 46, 56-57, 74-75, 389 and 391.

Microsoft press COmputer Dictionary Third Edition, pp. 294-295.

Piumarta et al., "Optimizing Direct Threaded Code by Selective Inlining," Association for Computing Machinery, vol. 33, No. 5, pp. 291-300, May 1, 1998.XP-000766278.

Tommesani, "Programming models".

Chang, Da-Wei et al., "EjVM: an economic Java run-time environment for embedded devices", *Software Practice and Experience*, 2001, John Wiley & Sons, vol. 31, No. 2, pp. 129-146. XP-000987539.

Gosling, James et al., "The Java™ Language Specification", 1996, *The Java™ Language Specification*, Chapter 12 Execution, pp. 215-236. XP-002032923.

Qian, Zhenyu et al., "A Formal Specification of Java™ Virtual Machine Instructions", 1997, *Technical Report, Universität Breman*, pp. 1-32. XP-002255760.

Office Action mailed on Jun. 16, 2004 from U.S. Appl. No. 09/819,120.

Office Action mailed on Feb. 14, 2005 from U.S. Appl. No. 09/819,120.
Office Action mailed on Jun. 27, 2005 from U.S. Appl. No. 09/819,120.
Office Action mailed on Jun. 4, 2004 from U.S. Appl. No. 09/818,096.
Office Action mailed on Jan. 14, 2005 from U.S. Appl. No. 09/818,096.
Office Action mailed on Jun. 27, 2005 from U.S. Appl. No. 09/818,096.
Goldberg, "A specification of java loading and bytecode verification," ACM, pp. 49-58, 1998.
Chang et al. "Type based verification of assembly language for compiler debugging," ACM TLDI, pp. 91-102, Jan. 2005.
Qian et al., "A formal specification of Java class loading," ACM OOPSLA, pp. 325-336, 2000.
Krintz et al., "Reducing transfer delay using java class file splitting and prefetching," ACM OOPSLA, pp. 276-291 Nov. 1999.
Bill Venners, "How the Java virtual machine handles method invocation and return" Java World, Jun. 1997, pp. 1-10.
Clausen et al., "Java Bytecode Compression for Low-End Embedded Systems," May 2000, ACM.
Chilimbi et al., "Cache-Conscious Structure Definition", pp. 13-24, 1999 ACM.
Nicol et al., "Empirical Study of parallel Trace-Driven LRU Cache Simulators", pp. 166-169, 1995 IEEE.

* cited by examiner

Constant Pool Section to Reference A Method

| 10: | class_index=11, name_type_index=12 | CONSTANT_Methodref |
|---|---|---|
| 11: | name_index=13 | CONSTANT_Class_info |
| 12: | name_index=14, decsriptror_index=15 | CONSTANT_NameAndType |
| 13: | length, pointer to class name srting | CONSTANT_Utf6_info |
| 14: | length, pointer to method name srting | CONSTANT_Utf6_info |
| 15: | length, pointer to signature srting | CONSTANT_Utf6_info |
| 16: | | |

FRAMEWORKS FOR LOADING AND EXECUTION OF OBJECT-BASED PROGRAMS

CROSS-REFERENCE TO RELATED APPLICATIONS

This application is related to U.S. patent application Ser. No. 09/703,361, filed Oct. 31, 2000, entitled "IMPROVED FRAMEWORKS FOR INVOKING METHODS IN VIRTUAL MACHINES", filed concurrently herewith, and hereby incorporated herein by reference.

This application is related to U.S. patent application Ser. No. 09/703,356, filed Oct. 31, 2000, entitled "IMPROVED METHODS AND APPARATUS FOR NUMERIC CONSTANT VALUE INLINING IN VIRTUAL MACHINES", filed concurrently herewith, and hereby incorporated herein by reference.

BACKGROUND OF THE INVENTION

The present invention relates generally to object-based high level programming environments, and more particularly, to frameworks for loading and execution of portable, platform independent programming instructions within a virtual machine.

Recently, the Java™ programming environment has become quite popular. The Java™ programming language is an language that is designed to be portable enough to be executed on a wide range of computers ranging from small devices (e.g., pagers, cell phones and smart cards) up to supercomputers. Computer programs written in the Java™ programming language (and other languages) may be compiled into Java™ virtual machine instructions (typically referred to as Java™ bytecodes) that are suitable for execution by a Java™ virtual machine implementation.

The Java™ virtual machine is commonly implemented in software by means of an interpreter for the Java™ virtual machine instruction set but, in general, may be software, hardware, or both. A particular Java™ virtual machine implementation and corresponding support libraries, together constitute a Java™ runtime environment.

Computer programs in the Java™ programming language are arranged in one or more classes or interfaces (referred to herein jointly as classes or class files). Such programs are generally platform, i.e., hardware and operating system, independent. As such, these computer programs may be executed, unmodified, on any computer that is able to run an implementation of the Java™ runtime environment. A class written in the Java™ programming language is compiled to a particular binary format called the "class file format" that includes Java™ virtual machine instructions for the methods of a single class. In addition to the Java™ virtual machine instructions for the methods of a class, the class file format includes a significant amount of ancillary information that is associated with the class. The class file format (as well as the general operation of the Java™ virtual machine) is described in some detail in *The Java™ Virtual Machine Specification* by Tim Lindholm and Frank Yellin (ISBN 0-201-31006-6), which is hereby incorporated herein by reference.

Conventionally, when a class file is loaded into the virtual machine, the virtual machine essentially makes a copy of the class file for its internal use. The virtual machine's internal copy is sometimes referred to as an "internal class representation." In conventional virtual machines, the internal class representation is typically almost an exact copy of the class file and it replicates the entire Constant Pool. This is true regardless of whether multiple classes loaded into the virtual machine reference the same method and thus replicate some (or much) of the same Constant Pool information. Such replication may, of course, result in an inefficient use of memory resources. In some circumstances (particularly in embedded systems which have limited memory resources) this inefficient use of memory resources can be a significant disadvantage.

As described in *The Java™ Virtual Machine Specification*, one of the structures of a standard class file is known as the "Constant Pool." The Constant Pool is a data structure that has several uses. One of the uses of the Constant Pool that is relevant to the present invention is that the Constant Pool contains the information that is needed to resolve various Java™ Instructions, for example, a method invocation instruction that can be invoked by any of the methods within the class. FIG. 1A (which may be familiar to those skilled in the art) is a representation of a Constant Pool section of a class file that contains the information necessary to uniquely identify and locate a particular invoked method.

Additionally, conventional virtual machine interpreters decode and execute the virtual machine instructions (Java™ bytecodes) one instruction at a time during execution, e.g., "at runtime." To execute a Java™ instruction, typically, several operations have to been performed to obtain the information that is necessary to execute the Java™ instruction. For example, to invoke a method referenced by a Java™ bytecode, the virtual machine must make several operations to access the Constant Pool simply to identify the information necessary to locate and access the invoked method.

To illustrate, FIG. 1B shows an exemplary conventional Java™ bytecode stream 150 including virtual machine instructions (typically referred to as Java™ bytecodes) that are suitable for execution by a conventional Java™ virtual machine. The first bytecode, Java™ bytecode 152 represents an arithmetic Java™ "Add" command with no associated parameters. The second bytecode, Java™ bytecode 154 represents a Java™ "iconst" instruction (load an integer constant on the stack). The Java™ bytecodes 156 and 157, CP-IndexA and CP-IndexB, respectively represent the first and second bytes of an index to the constant pool for the integer constant. It should be noted that Java™ bytecodes 152, 154 and 156 collectively represent a Java™ "iconst" instruction. In order to execute the Java™ Instruction iconst, at run time, an index to the Constant Pool is constructed from the CP-IndexA and CP-IndexA. Once an index to the Constant Pool has been determined, the appropriate structures in the Constant Pool have to be accessed so that the appropriate constant value can be determined. Accordingly, the Java™ instruction "iconstant" is executed but only after performing several operations at run time. As can be appreciated from the example above, the execution of a relatively simple instruction such as loading a constant value can take a significant amount of run time.

Furthermore, execution of relatively more complex Java™ instructions requires even more processing than noted above. For example, in order to conventionally execute an invoke method command 158, the constant pool has to be accessed several times at run time just to obtain the symbolic representation of information associated with the method. The CP_IndexC and CP_IndexD are indexes to a constant pool where information relating to the method including its parameter values needed for execution can be found. Accordingly, a CP_IndexD associated with the method instruction 158 is typically an index to an entry into the Constant Pool wherein that entry itself provides another pair of indexes to other entries in the Constant Pool, and so forth. Thus, execution of an invoke method command would require a significant amount of processing at run time (e.g., accessing the Constant Pool several times to obtain symbolic representation relating to the method). As will be appreciated, this conventional technique is an inefficient approach that may result in significantly longer execution times. In addition, once the symbolic information relating to the method has been obtained, there may be a need to convert the symbolic information into an internal representation at run time. Again, this is an inefficient approach.

Accordingly, there is a need for improved frameworks for loading and execution of portable, platform independent programming instructions within a virtual machine.

SUMMARY OF THE INVENTION

To achieve the foregoing and other objects of the invention, improved frameworks for loading and execution of portable, platform independent programming instructions within a virtual machine will be described. One aspect of the present invention seeks to provide a mechanism that will generally improve the runtime performance of virtual machines by eliminating the need to always traverse a constant pool at runtime to execute a Java™ instruction. In effect, the described system contemplates doing some extra work during the loading of a class into a virtual machine by obtaining the information from the constant pool during loading and representing that information in a form that can be used more efficiently at runtime.

In other aspects of the invention, specific data structures that are suitable for use within a virtual machine and methods for creating such data structures are described. In one embodiment, an enhanced Java™ bytecode representation having a pair of Java™ bytecode streams is disclosed. The enhanced Java™ bytecode has a Java™ code stream suitable for storing various Java™ commands as bytecodes within a code stream. A Java™ data stream is used to store the data parameters associated with the Java™ commands in the code stream. As will be appreciated, the invention allows for representation of actual parameter values, or references to actual parameter values, in the code stream. Accordingly, data parameters can be provided for efficient execution of Java™ instructions without requiring further processing of Constant Pools at run time. As a result, the performance of Java™ complaint virtual machine can be enhanced.

The invention can be implemented in numerous ways, including a system, an apparatus, a method or a computer readable medium. Several embodiments of the invention are discussed below.

As a method of creating data structures suitable for use by a virtual machine to execute computer instructions, one embodiment of the invention includes converting a stream, having commands and data associated with the commands, into a pair of streams for use in the virtual machine. The pair of streams includes a code stream and a data stream for data associated with the commands in the code stream.

As a data structure for containing computer executable commands and data associated with the computer executable commands, the data structure suitable for use by a virtual machine in an object oriented programming environment, one embodiment of the invention includes a code portion having one or more computer executable commands, and a data stream having data corresponding to the one or more computer executable commands.

As a method of executing computer instructions on a virtual machine, one embodiment of the invention includes the acts of: fetching a command associated with a computer instruction from a code stream; determining whether the command has an associated parameter; fetching from a data stream the associated parameter of the command when that command has an associated parameter; and executing the command with the associated parameters after the associated parameter of the commands have been fetched.

As a method of creating data structures suitable for use by a virtual machine to execute Java™ instructions, another embodiment of the invention includes converting a Java™ bytecode into a pair of Java™ bytecode streams suitable for use by the virtual machine. The pair of Java™ bytecode streams being a Java™ code stream that includes Java™ commands and a Java™ data stream that includes the data associated with the commands in the Java™ code stream.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 1A is a representation of a Constant Pool section of a Java™ class file.

DETAILED DESCRIPTION OF THE INVENTION

Figure 1B:
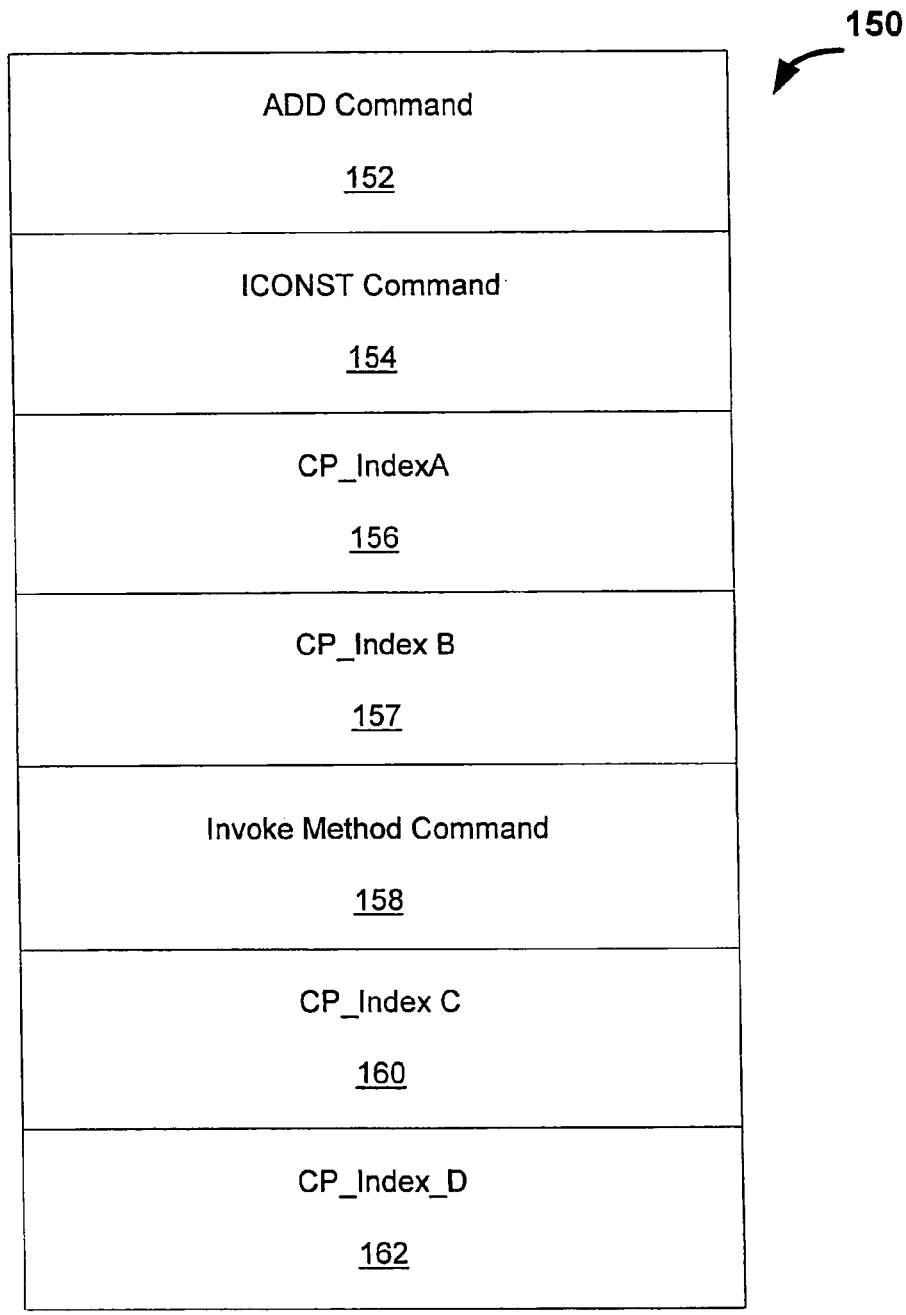
FIG. 1B shows an exemplary conventional Java™ bytecode stream including virtual machine instructions.

As described in the background section, the Java™ programming environment has enjoyed widespread success. Therefore, there are continuing efforts to extend the breadth of Java™ compatible devices and to improve the performance of such devices. One of the most significant factors influencing the performance of Java™ based programs on a particular platform is the performance of the underlying virtual machine. Accordingly, there have been extensive efforts by a number of entities to provide improved performance Java™ compliant virtual machines. In order to be Java™ compliant, a virtual machine must be capable of working with Java™ classes, which have a defined class file format. Although it is important that any Java™ virtual machine be capable of handling Java™ classes, the Java™ virtual machine specification does not dictate how such classes are represented internally within a particular Java™ virtual machine implementation.

The Java™ class file format utilizes the constant pool construct to store the information necessary to execute a Java™ instruction at run time. However, as suggested above, traversing the constant pool at runtime to obtain the information necessary to execute Java™ instructions is not particularly efficient. One aspect of the present invention seeks to provide a mechanism that will generally improve the runtime performance of virtual machines by eliminating the need to always traverse a constant pool at runtime to execute a Java™ instruction. Accordingly, a significant amount of work is conventionally performed at runtime. In effect, the described system contemplates doing some extra work during the loading of a class into a virtual machine by obtaining the information from the constant pool during loading and representing that information in a form that can be used more efficiently at runtime.

In other aspects of the invention, specific data structures that are suitable for use within a virtual machine and methods for creating such data structures are described. In one embodiment, an enhanced Java™ bytecode representation having a pair of Java™ bytecode streams is disclosed. The enhanced Java™ bytecode has a Java™ code stream suitable for storing various Java™ commands as bytecodes within a code stream. A Java™ data stream of the enhanced Java™ bytecode representation is used to store the data parameters associated with the Java™ commands in the code stream. As will be appreciated, the invention allows for representation in the code stream of actual parameter values, or references to actual parameter values. Accordingly, data parameters can be provided for efficient execution of Java™ instructions without requiring further processing of Constant Pools at run time. As a result, the performance of Java™ complaint virtual machine can be enhanced.

Furthermore, if the invention is implemented together with other improvements as described in concurrently filed, co-pending application No. U.S. patent application Ser. No. 09/703,361, filed Oct. 31, 2000, entitled "IMPROVED FRAMEWORKS FOR INVOKING METHODS IN VIRTUAL MACHINES", the constant pool may not even need to be copied into the virtual machine's in order to invoke methods. Thus, the use of the invention in conjunction with the improved techniques provided as described in U.S. patent application Ser. No. 09/703,361, filed Oct. 31, 2000, entitled "IMPROVED FRAMEWORKS FOR INVOKING METHODS IN VIRTUAL MACHINES" has the potential in many circumstances to even further improve the performance of the virtual machines.

Embodiments of the invention are discussed below with reference to FIGS. 2–7. However, those skilled in the art will readily appreciate that the detailed description given herein with respect to these figures is for explanatory purposes as the invention extends beyond these limited embodiments.

Figure 2:
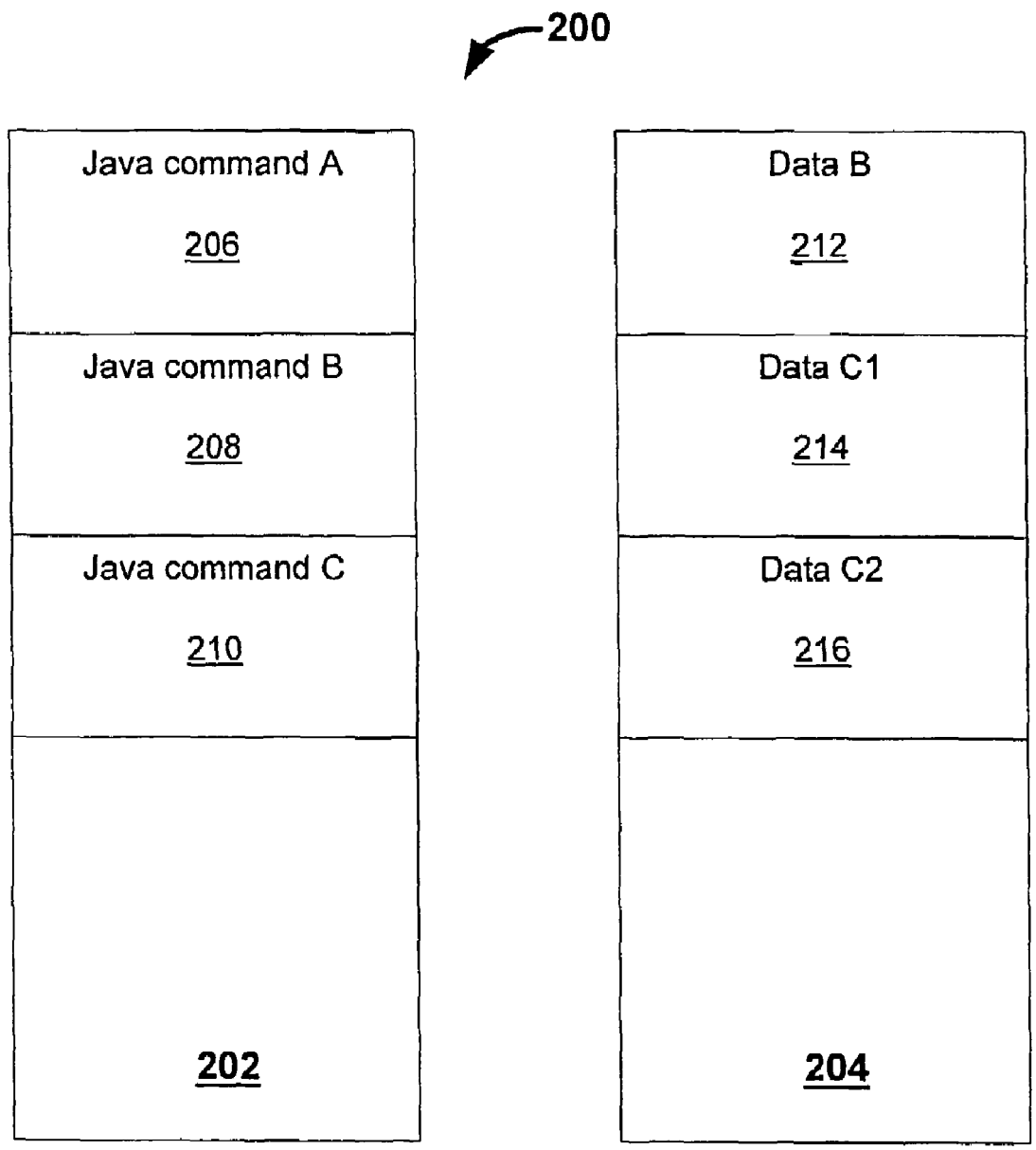
FIG. 2 is a block diagram representation of Java™ bytecode streams in accordance with one embodiment of the invention.

FIG. 2 is a block diagram representation of Java™ bytecode streams 200 in accordance with one embodiment of the invention. The Java™ bytecode streams 200 can be, for example, implemented as a data structure embodied in a computer readable medium that is suitable for use by a virtual machine. As shown in FIG. 2, the Java™ bytecode streams 200 includes a pair of Java™ bytecode streams, namely, a Java™ code stream 202 and a Java™ data stream 204. The code stream 202 includes various Java™ commands 206, 208, and 210. The code stream 206 represents a Java™ command A which does not have any parameters associated with it. On the other hand, code streams 208 and 210 represent respectively Java™ commands B and C with associated data parameters which are represented in the Java™ data stream 204. The Java™ bytecode 212 represents data B which is the data parameters corresponding to the Java™ command B of Java™ code stream 202. It should be noted that the Java™ command B and data B together represent a Java™ instruction corresponding to a Java™ command B with its associated data. Similarly, the Java™ bytecodes 214 and 216 represent respectively data C1 and C2 which collectively represent the data parameters corresponding to the Java™ command C of Java™ code stream 202. Accordingly, the Java™ command C, data C1 and data C2 together represent a Java™ instruction corresponding to a Java™ command C with its associate data represented in bytecodes 214 and 216.

Figure 3:
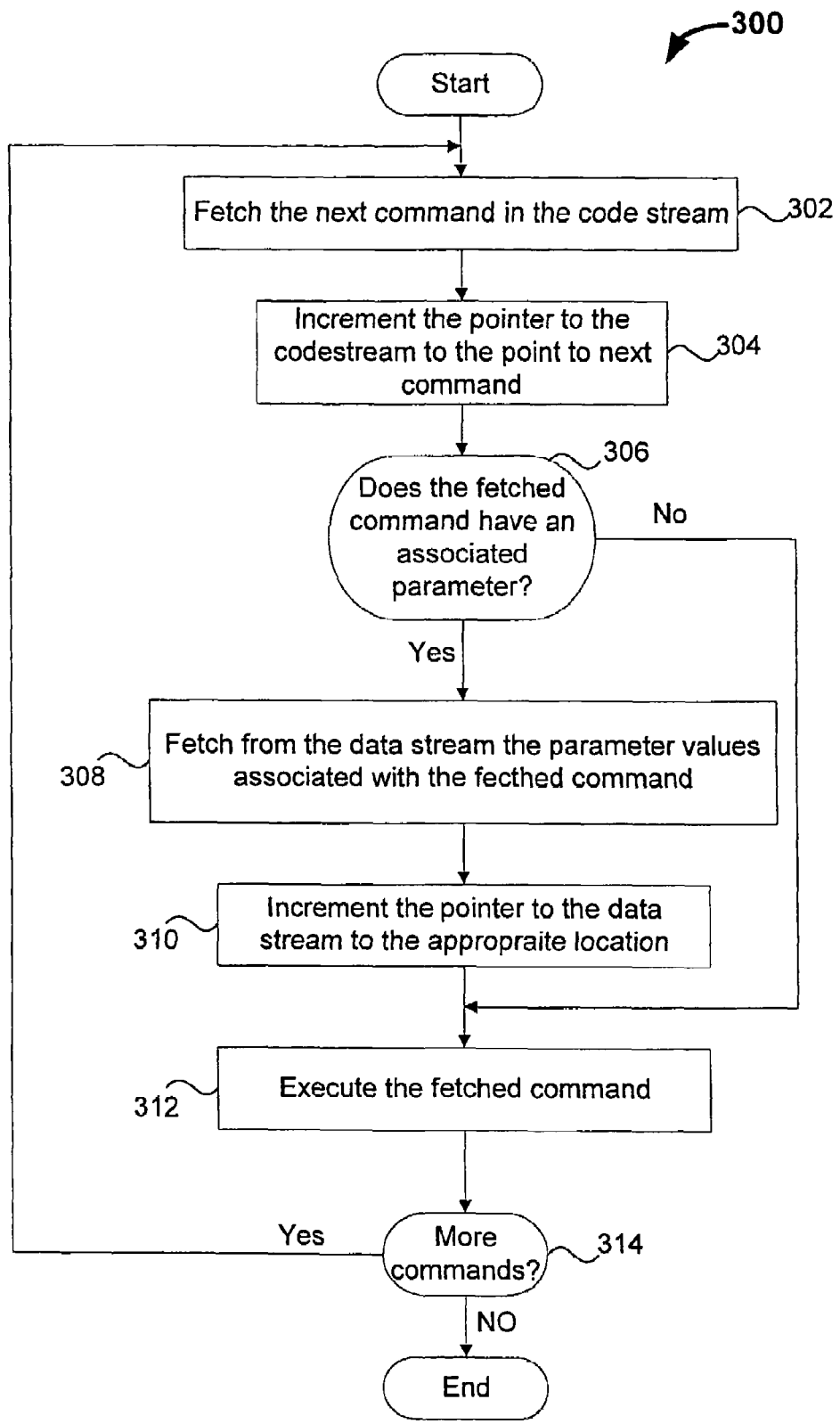
FIG. 3 illustrates an execution method for executing Java™ bytecode instructions in accordance with one embodiment of the invention.

As noted above, the Java™ bytecode 200 streams are suitable for use by a virtual machine. Referring now to FIG. 3, an exemplary execution method 300 for executing Java™ bytecode instructions is disclosed. The execution method 300 can be used, for example, in conjunction with a pair of Java™ bytecode streams, for example, the Java™ code stream 202 and Java™ data stream 204. Initially, at operation 302, the next command in the code stream is fetched. For example, referring back to FIG. 2, the next command fetched can be the bytecode 206 of the Java™ code stream 202. Next, at operation 304, a pointer to the Java™ code stream is incremented to point to the next command in the Java™ code stream. Referring again to FIG. 2, a pointer to the Java™ code stream 206 is incremented to point to the next command in the Java™ code stream, foe example, the bytecode 206 (Java™ command B). Following incrementing the pointer at operation 304, the execution method 300 proceeds to operation 306 where a determination is made as to whether the fetched command has an associated parameter. If it is determined at operation 306 that the fetched command does not have an associated parameter, for example, in the case of Java™ command A of FIG. 2, the execution method 300 proceeds directly to operation 312 where the fetched command (with no associated parameter) is executed. Thereafter, at operation 314 a determination is made as to whether there are more commands in the Java™ code stream to execute. If it is determined at operation 314 that there are no more commands to execute, the execution method 300 ends. However, if it is determined at operation 314 that there is at least one more command to execute, that execution method 300 proceeds back to operation 302 where the next command in the code stream is fetched.

On the other hand, if it is determined at operation 306 that the fetched command has an associated parameter, the execution method 300 proceeds to operation 308 where the parameter values associated with the fetched command are fetched from the data stream. Referring back to FIG. 2, for example, in the case when the fetched command is the Java™ command B of bytecode 208, the parameter values associated with Java™ command B, namely, data B of the bytecode 212 is fetched. Similarly, in the case of the Java™ command C (bytecode 210), data C1 and data C2 (bytecodes 214 and 216) would be fetched at operation 308. As will be appreciated, the invention allows for parameter values in the data stream which can represent actual parameter values (or references to actual parameter values). Accordingly, the data parameters in the data code can be used to execute instructions without requiring further processing of Constant Pool.

After the appropriate data is fetched, at operation 310, the pointer to the data command stream is incremented to point to the appropriate position in the data stream. As will be appreciated, the pointer to the data stream can be updated based on the command type (i.e., based on the number of bytecodes appropriated for the data associated with the command). When the command and the appropriate parameter values have been fetched, the execution method 300 proceeds to operation 314 where the fetched command is executed. Finally, at operation 314 a determination is made as to whether there are more commands in the Java™ code stream to execute. If it is determined at operation 314 that there are no more commands to execute, the execution method 300 ends. However, if it is determined at operation 314 that there is at least one more command to execute, that execution method 300 proceeds back to operation 302 where the next command in the code stream is fetched.

Figure 4:
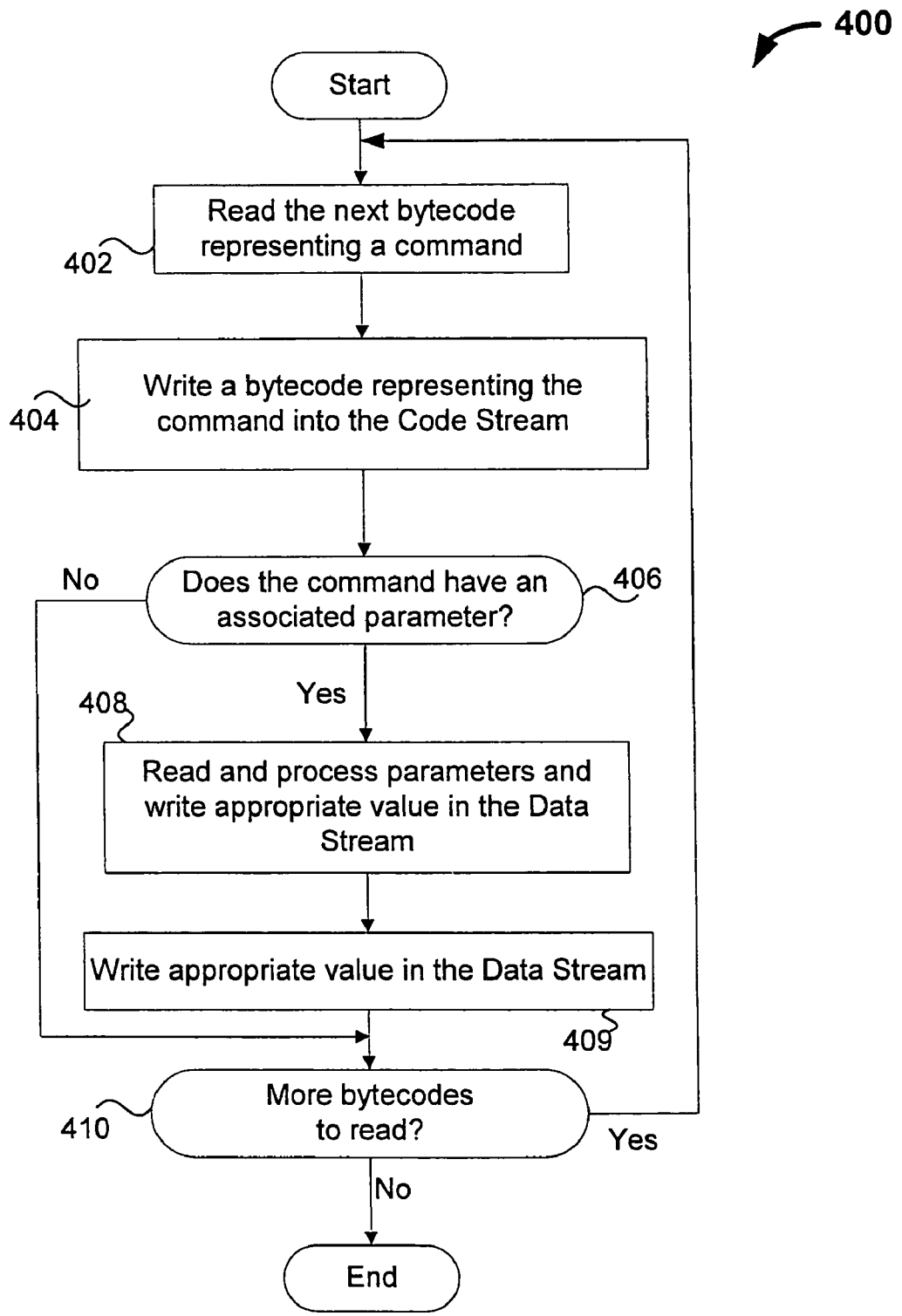
FIG. 4 illustrates an exemplary bytecode stream generation method in accordance with one embodiment of the invention.

As noted above, the invention, among other things, provides for a pair of Java™ bytecode streams suitable for use by a virtual machine, for example, the code stream 202 and a Java™ data stream 204. Referring now to FIG. 4, an exemplary bytecode stream generation method 400 for generation of an enhanced bytecode representation is disclosed. The bytecode stream generation can be used, for example, to generate a pair of bytecode streams from a conventional Java™ bytecode stream 150 of FIG. 1. Initially, at operation 402, the next bytecode representing a command is read. Next, at operation 404, a bytecode representing the command is written into an entry of a code stream, for example, the Java™ code stream 202 of FIG. 2. Following operation 404, a determination is made at operation 406 as to whether the command has an associated parameter. If it is determined at operation 406 that the command does not have any associated parameters, the bytecode stream generation method 400 proceeds directly to operation 410 where a determination is made as to whether there are more bytecodes to read. If there are no more bytecodes to process, the bytecode stream generation method 400 ends. However, if there is at least one more bytecodes to read, the bytecode stream generation method 400 proceeds to operation 402 where the next bytecode representing a command is read.

On the other hand, when it is determined at operation 406 that the command has associated parameters, the bytecode stream generation method 400 proceeds to operation 408 where the associated parameters are read and processed. As will be appreciated, the processing of the associated parameters can be performed based on the command type in accordance with one aspect of the invention. This processing will be further illustrated in FIG. 5 below. After appropriate processing of associated parameters, at operation 409, an appropriate value is written to a data stream, for example, the Java™ data stream of FIG. 2. Next, the bytecode stream generation method 400 proceeds to operation 410 where a determination is made as to whether there are more bytecodes to read. if there is at least one more bytecodes to read, the bytecode stream generation method 400 proceeds to operation 402 where the next bytecode representing a command is read. However, if there are no more bytecodes to process, the bytecode stream generation method 400 ends.

Figure 5:
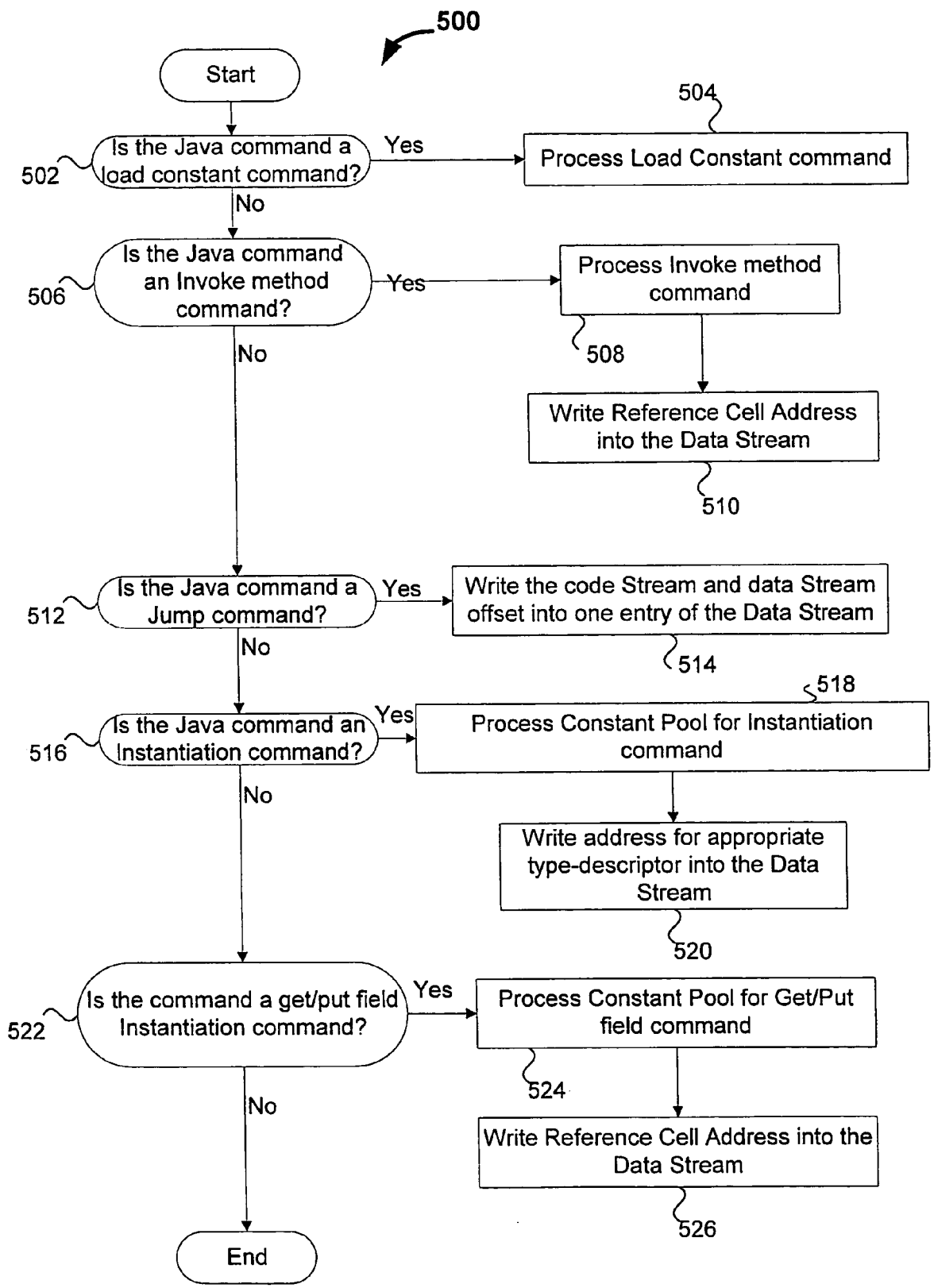
FIG. 5 illustrates an exemplary loading method for loading bytecodes of a class file in accordance with one embodiment of the invention.

FIG. 5 illustrates an exemplary loading method 500 for loading bytecodes of a class file in accordance with one embodiment of the invention. For the sake of illustration, in the described embodiment, the loading is used in a Java™ runtime environment to load a Java™ class file. The class file can include various Java™ instructions (Java™ commands and associated data parameters). Typically, this would be accomplished by a Java™ class loader. It should be noted that in the described embodiment the Java™ commands are written into a Java™ code stream. Accordingly, the loading method 500 illustrates loading operations that can be performed to provide the corresponding Java™ code stream for the Java™ code stream.

Initially, at operation 502, a determination is made as to whether the Java™ command is a load constant command. If it is determined at operation 502 that the Java™ command is a load constant command, the loading method 500 proceeds to operation 504 where the load constant command is processed in accordance with one aspect of the invention. For example, such processing can be performed as illustrated below in FIG. 6.

On the other hand, if it is determined at operation 502 that the Java™ command is not a load constant command, the loading method 500 proceeds to operation 506 where a determination is made as to whether the Java™ command is an invoke method command. If it is determined at operation 506 that the Java™ command is an invoke method command, the loading method 500 proceeds to operation 508 where the invoke method command is processed in accordance with another aspect of the invention. In a preferred embodiment, the invoke method command is processed to create a reference cell which provides the information necessary to invoke the method at run time. For example, such processing can be performed as illustrated in co-pending U.S. patent application Ser. No. 09/703,361, filed Oct. 31, 2000, entitled "IMPROVED FRAMEWORKS FOR INVOKING METHODS IN VIRTUAL MACHINES". Accordingly, in the described embodiment, the address of the reference cell corresponding to the invoke method command is written into the data stream.

However, If it is determined at operation 506 that the Java™ command is not an Invoke method command, the loading method 500 proceeds to operation 512 where a determination is made as to whether the Java™ command is a Jump command. If it is determined at operation 512 that Java™ command is a Jump command, the appropriate code and data stream offsets of the Jump command are written into the data stream entry corresponding to the jump.

On the other hand, if it is determined at operation 512 that the Java™ command is not a jump command, the loading method 500 proceeds to operation 516 where a determination is made as to whether the Java™ command is an instantiation command. As will be appreciated, if it is determined at operation 516 that the Java™ command is an instantiation command, the Constant pool information for the instantiation command can be processed at operation 518. Following operation 518, in the described embodiment, the appropriate type-descriptor is written into the data stream at operation 520. However, if it is determined at operation 516 that the Java™ command is not an instantiation command, the loading method 500 proceeds to operation 522 where it is determined whether the Java™ command is a Get/Put field command.

As will be appreciated, if it is determined at operation 522 that the Java™ command is a Get/Put field command, the Constant pool information for the instantiation command can be processed at operation 518. For example, a reference cell which provides the information necessary to execute the Get/Put field command at run time can be generated. Accordingly, following operation 524, the address of a reference cell corresponding to the Get/Put field command can be written into the data stream at operation 526. The loading method 500 ends if it is determined at operation 522 that the Java™ command is not a Get/Put field command.

Figure 6:
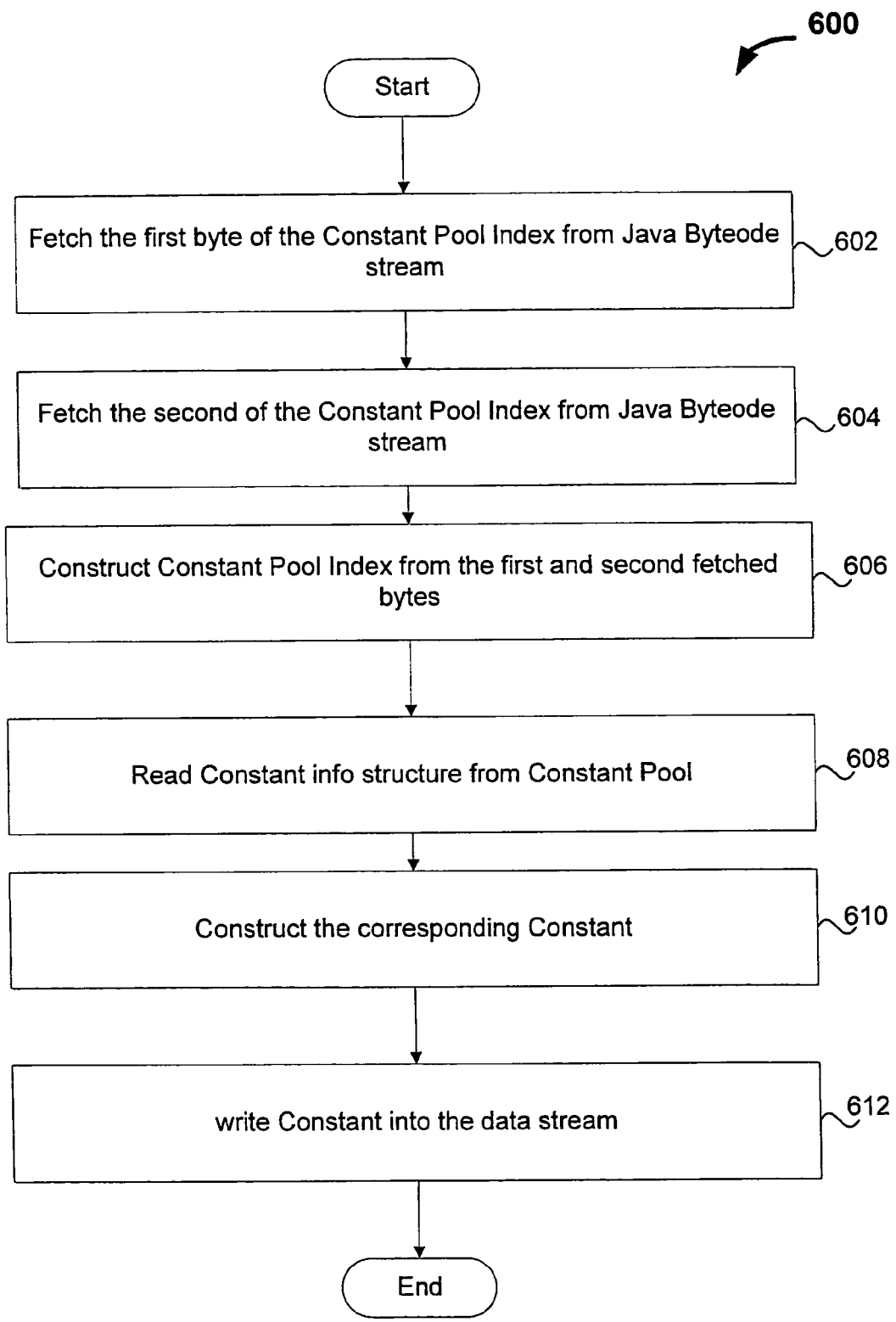
FIG. 6 illustrates a processing method for processing a Java™ Load constant command in accordance with one embodiment of the invention.

FIG. 6 illustrates a processing method 600 for processing a Java™ Load constant command in accordance with one embodiment of the invention. The processing method 600 represents operations that can be performed, for example, at operation 508 of FIG. 5. It should be noted that the processing method 600 can be used to convert a conventional representation of a Load constant command with its associated parameter (e.g., bytecodes 154, 156, and 157 of FIG. 1). Accordingly, the processing method 600 can be used to represent the Load constant command and its associated parameter respectively into a Java™ code stream and a Java™ data stream, for example, the Java™ code stream 202 and Java™ data stream 204 of FIG. 2.

Initially, at operation 602, the first bytecode of the Constant Pool index (e.g., bytecode 156 of FIG. 1) is fetched. Next, at operation 604, the second bytecode of the Constant Pool index (e.g., byte code 157 of FIG. 1) is fetched. As will be appreciated, at operation 606, the Constant Pool index is constructed from the first and second fetched bytes. After construction of the Constant Pool index, appropriate data structures of the Constant Pool are read at operation 608. Next, at operation 610, the corresponding constant value is determined based on the constant information read at operation 608. As will appreciated, other operations can be performed, for example, if necessary, byte alignment can be performed at operation 610. Finally, at operation 612 the constant value determined at operation 610 is written into a Java™ data stream, for example, the Java™ data stream 204 of FIG. 2. It should be noted that corresponding Java™ Load constant command is written into an appropriate entry of a Java™ code stream, for example, the Java™ code stream 202 of FIG. 2.

Figure 7:
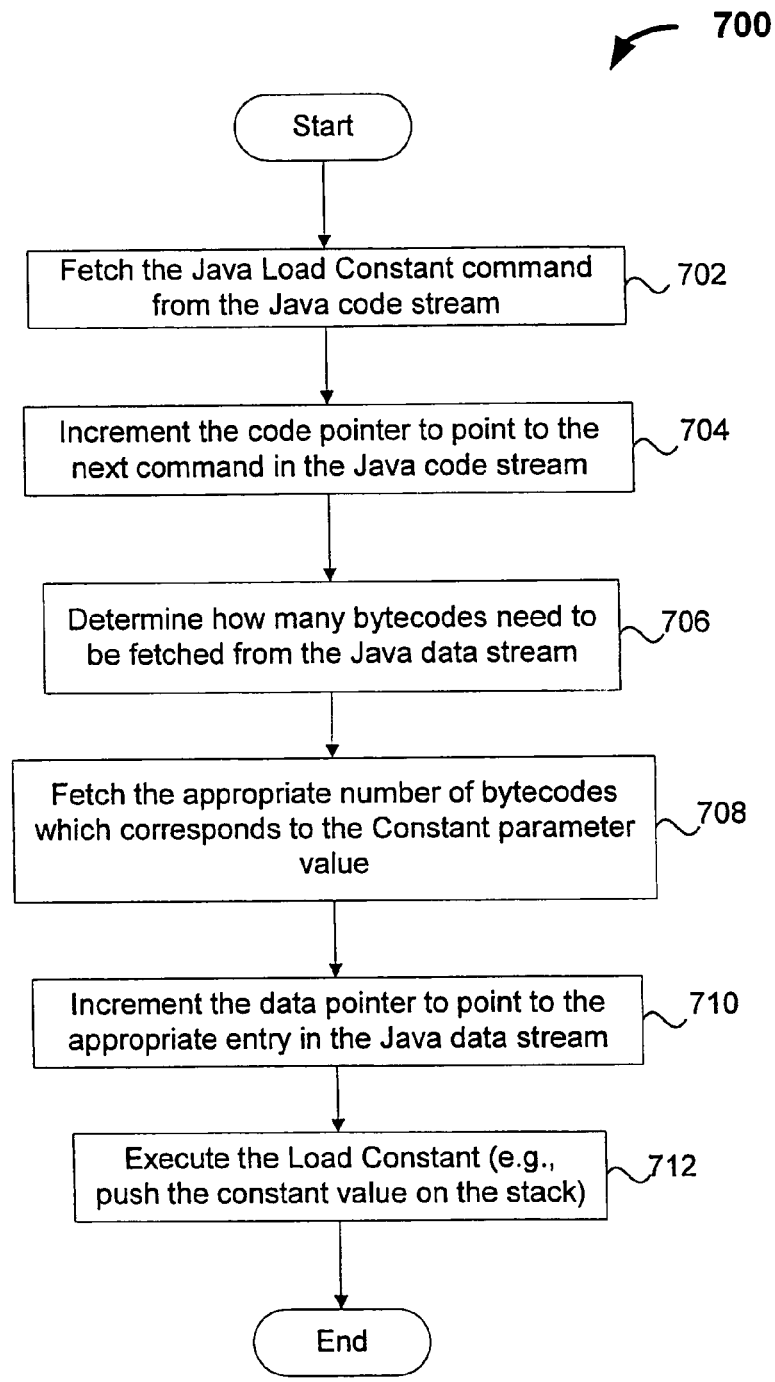
FIG. 7 illustrates an execution method for executing a Java™ Load Constant command in accordance with one embodiment of the invention.

FIG. 7 illustrates an execution method 700 for executing a Java™ Load Constant command in accordance with one embodiment of the invention. It should be noted that the execution method 700 can be implemented in a virtual machine in conjunction with an enhanced bytecode representation to allow more efficient run time execution of a Java™ Load Constant command. For example, the processing method 600 can be used to generate the bytecode streams 200 having the Java™ code stream 202 and Java™ data stream 204. Accordingly, The Java™ Load Constant command can be stored in the code stream while the corresponding Constant parameters value are stored in the data stream.

Initially, at operation 702, the Java™ Load Constant command is fetched from the code stream. For example, referring back to FIG. 2, the bytecode 206 of the Java™ code stream 206 (Java™ command A), representing a Java™ Load Constant command is fetched from the Java™ code stream 202. Next, at operation 704, a pointer to the Java™ code stream is incremented to point to the next command in the Java™ code stream. Referring again to FIG. 2, a pointer to the Java™ code stream 206 is incremented to point to the next command in the Java™ code stream, namely, code stream 206 (Java™ command B). Following incrementing the pointer at operation 704, the execution method 700 proceeds to operation 706 where it is determined how many bytecodes corresponding to the Constant parameter value needs to be fetched from the Java™ data stream. As will appreciated this determination can be made based on the Constant's type (e.g., double, integer, float, etc.). Accordingly, at operation 708, the appropriate number of bytes which correspond to the Constant parameter value are fetched.

After the appropriate constant value is fetched, at operation 710, the pointer to the data command stream is incremented to point to the appropriate position in the data stream. As will be appreciated, the pointer to the data stream can be updated based on the type of the Load constant command (i.e., based on the number of bytecodes appropriated for the data associated with the command). Finally, at operation 712, the Constant Load command is executed, for example, the appropriate Constant value command in pushed on the stack.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of executing computer instructions by a virtual machine that includes an interpreter, the method comprising:
   receiving a single stream of Bytecode instructions in a class file for execution by the virtual machine;
   converting, at load time prior to execution time, the single stream of Bytecode instructions into a pair of streams in the virtual machine, wherein the pair of streams includes a code stream and a data stream, wherein the code stream includes only virtual machine commands, wherein the data stream includes only data associated with virtual machine commands stored in the code stream, and wherein said converting further comprises:
   determining whether at least one Bytecode which represents a first command in the single stream of Bytecodes has associated data in the single stream;
   accessing a constant pool associated with the class file when said determining determines that the first command in said single stream has data associated with it;
   determining, based on the accessing of the constant pool, at least one data parameter value for the first command;
   loading, prior to execution time, the first command in said code stream in the virtual machine;
   loading, prior to execution time, the at least one data parameter value in the data stream in the virtual machine;
   fetching, by the interpreter at execution time, the first command from the code stream in the virtual machine;
   determining, by the interpreter at execution time, whether the first command has an associated data parameter value in the data stream;
   fetching, by the interpreter at execution time, from the data stream in the virtual machine the associated at least one data parameter value when said determining determines that the first command has an associated data parameter value; and
   executing by said interpreter at execution time the first command with the at least one data parameter value when said determining determines that the first command has an associated data parameter value thereby executing the first command without processing the constant pool at execution time in order to determine the at least one data parameter value needed to execute the first command.

2. A method as recited in claim 1, wherein said method further comprises:
   not providing a data entry in the data stream for the first command when the first command does not have data associated with it.

3. A method as recited in claim 1, wherein said method further comprises:

writing a representation of a second command associated with another instruction into a second code entry of the code stream;

determining whether the second command has data associated with it; and writing a representation of the associated data or a reference to a representation of the data associated with the second command into a second data entry of the data stream when the command has associated data.

4. A method as recited in claim 3, wherein the first and second entries of the code stream are adjacent to each other.

5. A method as recited in claim 1, wherein the method further comprises:

updating a pointer to the command stream; and updating a pointer to the data stream.

6. A method as recited in claim 1, wherein the code stream includes commands represented as bytecodes, and the data stream includes data represented as bytecodes.

7. A method as recited in claim 1, wherein the first command can be a load constant command, an invoke method command, a jump command, an instantiation command, or a get/put field command.

8. A method as recited in claim 1, wherein said converting of said stream further comprises:

writing a representation of the first command associated with a first instruction into a code entry of the code stream;

determining whether the first command has associated data; and reading the associated data from a Constant Pool when the command has associated data;

processing the associated data from the Constant Pool;

writing a representation of the associated data or a reference to a representation of the data associated into the code stream after said processing of the associated data.

9. A method as recited in claim 8, wherein said processing operates to determine a constant value associated with a Load Constant command.

10. A method as recited in claim 8, wherein said processing operates to determine a reference to a method invocation cell that includes information relating to a invoke method command.

11. A method as recited in claim 8, wherein said processing Jump command.

12. A method as recited in claim 8, wherein said processing operates to process a Constant Pool associated with an instantiation command.

13. A method as recited in claim 8, wherein said processing operates to process a Constant Pool associated with a Get/Put field command.

14. A computer system for executing computer instructions by a virtual machine that includes an interpreter, wherein said computer system is capable of:

receiving a single stream of Bytecode instructions in a class file for execution by the virtual machine;

converting, at load time prior to execution time, the single stream of Bytecode instructions into a pair of streams in the virtual machine, wherein the pair of streams includes a code stream and a data stream, wherein the code stream includes only virtual machine commands, wherein the data stream includes only data associated with virtual machine commands stored in the code stream, and wherein said converting further comprises:

determining whether at least one Bytecode which represents a first command in the single stream of Bytecodes has associated data in the single stream;

accessing a constant pool associated with the class file when said determining determines that the first command in said single stream has data associated with it;

determining, based on the accessing of the constant pool, at least one data parameter value for the first command;

loading, prior to execution time, the first command in said code stream in the virtual machine;

loading, prior to execution time, the at least one data parameter value in the data stream in the virtual machine;

fetching, by the interpreter at execution time, the first command from the code stream in the virtual machine;

determining, by the interpreter at execution time, whether the first command has an associated data parameter value in the data stream;

fetching, by the interpreter at execution time, from the data stream in the virtual machine the associated at least one data parameter value when said determining determines that the first command has an associated data parameter value; and executing by said interpreter at execution time the first command with the at least one data parameter value when said determining determines that the first command has an associated data parameter value, thereby executing the first command without processing the constant pool at execution time in order to determine the at least one data parameter value needed to execute the first command.

15. A computer system as recited in claim 14, wherein said computer system is further capable of:

not providing a data entry in the data stream for the first command when the first command does not have data associated with it.

16. A computer system as recited in claim 14, wherein said computer system is further capable of:

writing a representation of a second command associated with another instruction into a second code entry of the code stream;

determining whether the second command has data associated with it; and writing a representation of the associated data or a reference to a representation of the data associated with the second command into a second data entry of the data stream when the command has associated data.

17. A computer system as recited in claim 16, wherein the first and second entries of the code stream are adjacent to each other.

18. A computer system as recited in claim 14, wherein said computer system is further capable of:

updating a pointer to the command stream; and updating a pointer to the data stream.

19. A computer system as recited in claim 16, wherein the first command can be a load constant command, an invoke method command, a jump command, an instantiation command, or a get/put field command.

20. A computer system as recited in claim 14, wherein said converting of said stream further comprises:

writing a representation of the first command associated with a first instruction into a code entry of the code stream;

determining whether the first command has associated data;

reading the associated data from a Constant Pool when the command has associated data;

processing the associated data from the Constant Pool; and writing a representation of the associated data or a reference to a representation of the data associated into the code stream after said processing of the associated data.

21. A computer readable medium including computer program code for executing computer instructions by a virtual machine that includes an interpreter, wherein said computer readable medium includes:
   program code for receiving a single stream of Bytecode instructions in a class file for execution by the virtual machine;
   program code for converting, at load time prior to execution time, the single stream of Bytecode instructions into a pair of streams in the virtual machine, wherein the pair of streams includes a code stream and a data stream, wherein the code stream includes only virtual machine commands, wherein the data stream includes only data associated with virtual machine commands stored in the code stream, and wherein said converting further comprises:
      determining whether at least one Bytecode which represents a first command in the single stream of Bytecodes has associated data in the single stream;
      accessing a constant pool associated with the class file when said determining determines that the first command in said single stream has data associated with it;
      determining, based on the accessing of the constant pool, at least one data parameter value for the first command;
   program code for loading, prior to execution time, the first command in said code stream in the virtual machine;
   program code for loading, prior to execution time, the at least one data parameter value in the data stream in the virtual machine;
   program code for fetching, by the interpreter at execution time, the first command from the code stream in the virtual machine;
   program code for determining, by the interpreter at execution time, whether the first command has an associated data parameter value in the data stream;
   program code for fetching, by the interpreter at execution time, from the data stream in the virtual machine the associated at least one data parameter value when said determining determines that the first command has an associated data parameter value; and
   program code for executing by said interpreter at execution time the first command with the at least one data parameter value when said determining determines that the first command has an associated data parameter value, thereby executing the first command without processing the constant pool at execution time in order to determine the at least one data parameter value needed to execute the first command.

22. A computer readable medium as recited in claim 21, further comprising:
   computer program code for not providing a data entry in the data stream for the first command when the first command does not have data associated with it.

23. A computer readable medium as recited in claim 21, further comprising:
   computer program code for writing a representation of a second command associated with another instruction into a second code entry of the code stream;
   computer program code for determining whether the second command has data associated with it; and
   computer program code for writing a representation of the associated data or a reference to a representation of the data associated with the second command into a second data entry of the data stream when the command has associated data.

24. A computer readable medium as recited in claim 21, wherein the first and second entries of the code stream are adjacent to each other.

25. A computer readable medium as recited in claim 21, further comprising:
   computer program code for updating a pointer to the command stream; and
   computer program code for updating a pointer to the data stream.

26. A computer readable medium as recited in claim 21, wherein the first command can be a load constant command, an invoke method command, a jump command, an instantiation command, or a get/put field command.

27. A computer readable medium as recited in claim 21, wherein said computer code for converting of said stream further comprises:
   computer program code for writing a representation of the first command associated with a first instruction into a code entry of the code stream;
   computer program code for determining whether the first command has associated data;
   computer program code for reading the associated data from a Constant Pool when the command has associated data;
   computer program code for processing the associated data from the Constant Pool; and
   computer program code for writing a representation of the associated data or a reference to a representation of the data associated into the code stream after said processing of the associated data.

* * * * *